Dec. 15, 1970   M. F. HELMUS   3,546,887
RAILROAD CABLE LAYING APPARATUS
Filed Oct. 9, 1968   4 Sheets-Sheet 1
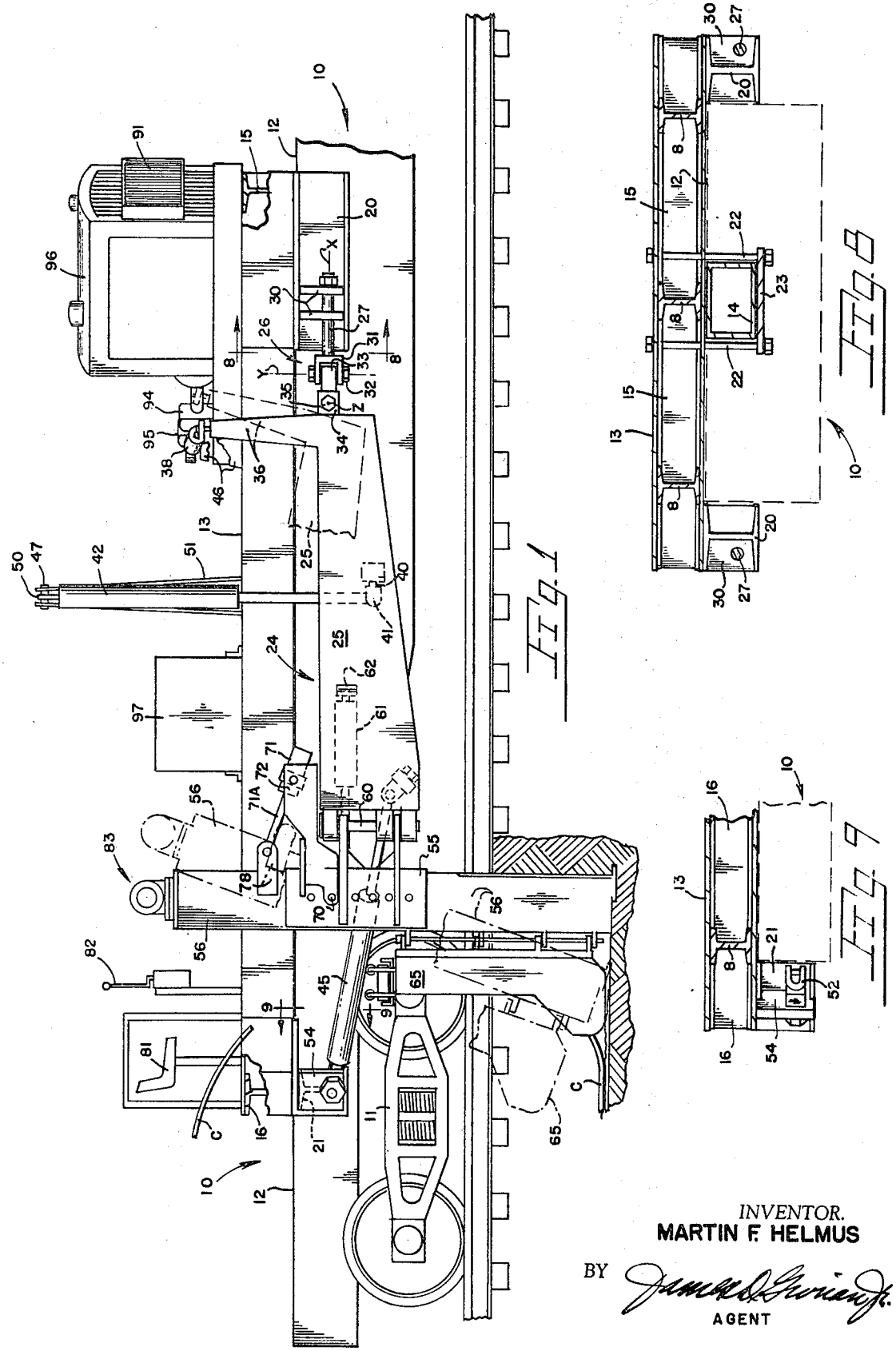
INVENTOR.
MARTIN F. HELMUS
BY *James D. Givier Jr.*
AGENT

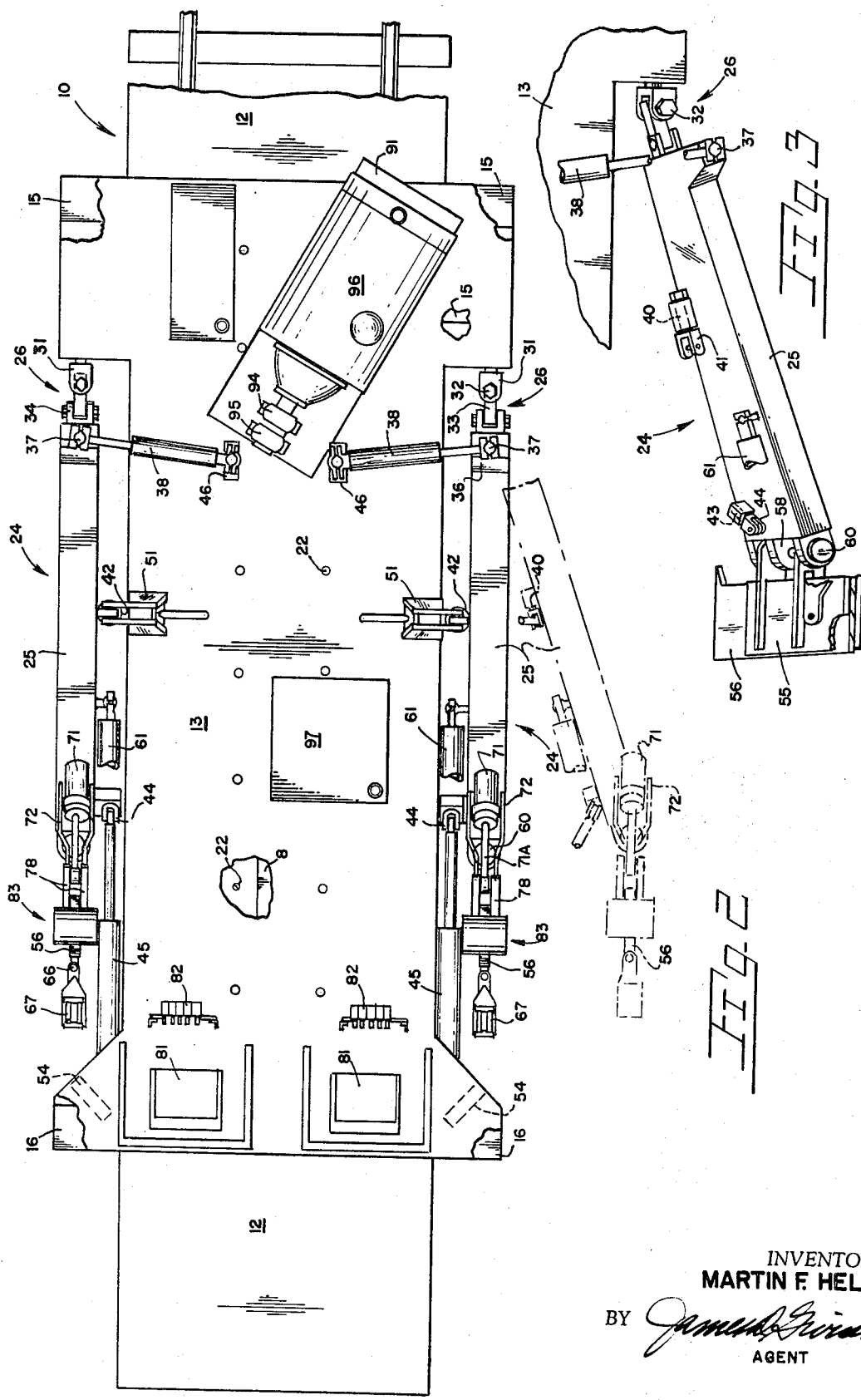

Dec. 15, 1970   M. F. HELMUS   3,546,887
RAILROAD CABLE LAYING APPARATUS
Filed Oct. 9, 1968   4 Sheets-Sheet 3
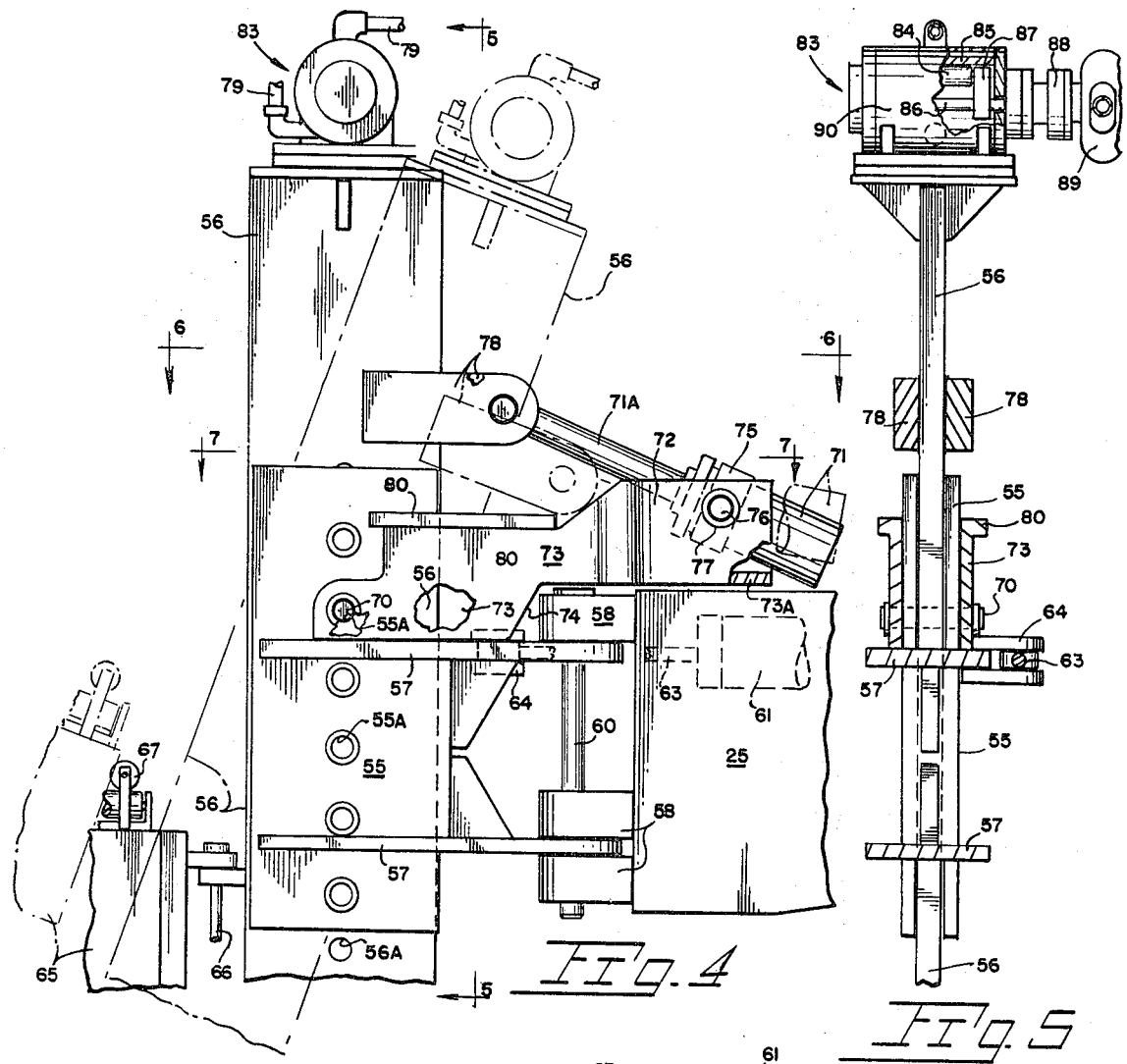
Fig. 4
Fig. 5
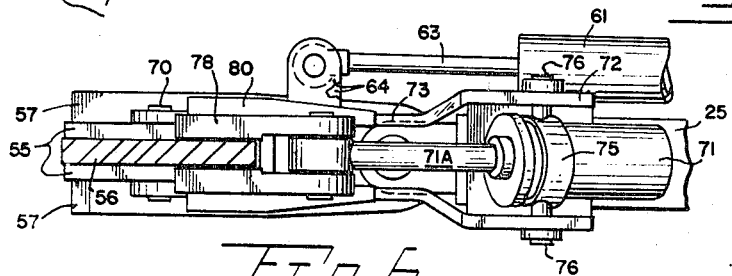
Fig. 6
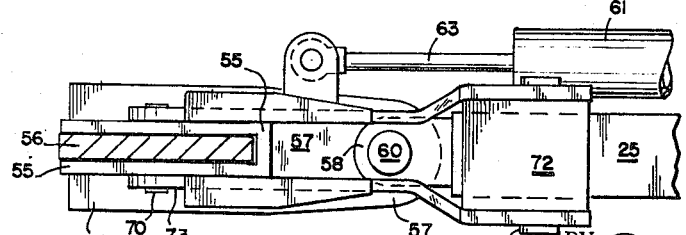
Fig. 7
INVENTOR.
MARTIN F. HELMUS
BY
AGENT

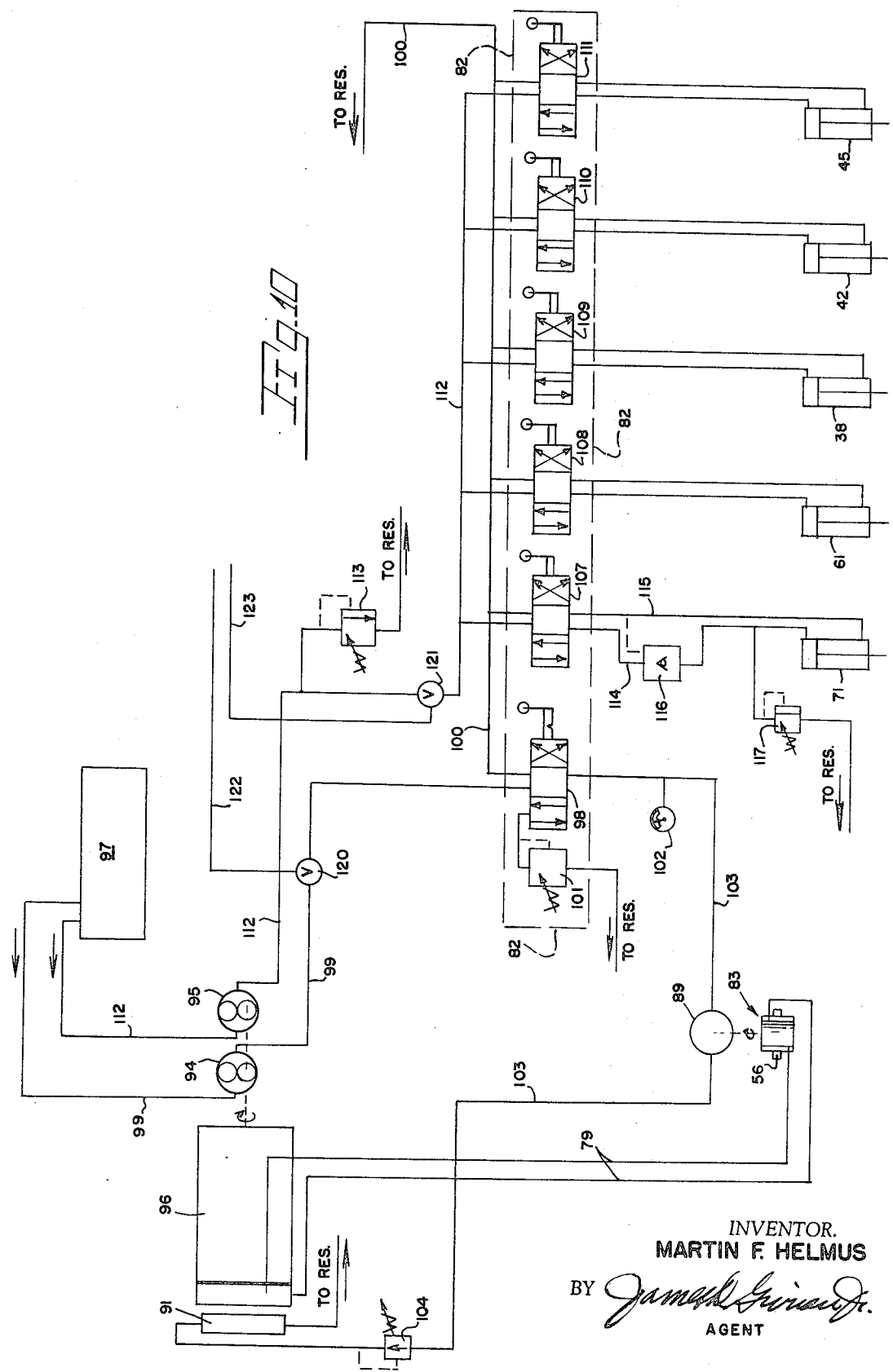

United States Patent Office 3,546,887
Patented Dec. 15, 1970

3,546,887
RAILROAD CABLE LAYING APPARATUS
Martin F. Helmus, Philadelphia, Pa., assignor to Henkels and McCoy, Inc., Blue Bell, Pa., a corporation of Pennsylvania
Filed Oct. 9, 1968, Ser. No. 766,080
Int. Cl. F16l 1/00
U.S. Cl. 61—72.1                                Claims 18

ABSTRACT OF THE DISCLOSURE

The present disclosure concerns an apparatus for burying lineal material adjacent railroad tracks utilizing a track supported mobile base. Rearwardly trailed, elongate beams extend laterally in a positionable manner from the car side and draw a blade element through the ground to form a kerf within which continuous flexible material such as signal or electrical cable is deposited by a cable shoe carried by the blade. Hydraulic components position the beam to adjustably locate the blade for depositing the cable at selected depths and distances from the railroad tracks. Release means permit the earth penetrating blade to avoid blade damaging impact with ground objects in its path.

BACKGROUND OF THE INVENTION

The present invention relates generally to the art of cable laying and more particularly to the progressive burying of continuous flexible material from a mobile base in the form of a railroad car.

The prior art, to the extent known, discloses numerous mechanical apparatuses for cable laying or burying, the prime mover for such most commonly being a track equipped tractor known as a crawler in the art. More recent developments in this field have included the advance of providing a side mounted cable plow apparatus borne by a wheeled vehicle and capable of burying cable at selected lateral distances from the vehicular path. Such a side mounted cable plow is shown in the U.S. patent to F. R. Kinnan, No. 3,307,363, issued Mar. 7, 1967.

The prior art has, to my knowledge, been directed mainly toward providing cable laying equipment for operation in unimproved areas wherein it is entirely practical to trail the earth cutting blade from a track equipped tractor. In distinction thereto the present invention is directed toward the utilization of a rail mounted vehicle as a mobile base for cable laying instrumentalities for the laying of continuous conduit material or electrical cable for communications closely adjacent the railroad tracks and if desired in the roadbed itself. Heretofore, the installation of electrical communication cables along railroad trackage involved the sizeable and costly task of erecting aerial transmission lines including pole installation.

The cable laying apparatus of the present invention enables the economical burying of railside cables or conduits to accomplish all the highly desirable and well known overall benefits of buried transmission components. Such benefits are believed widely known in the general art and henceforth need not be elaborated upon.

The use of existant or well known cable laying arrangements for burying railside cable is not practical by reason of damage to the roadbed and secondly the lack of uniform operating space alongside the track to permit passage of a ground supported tractor.

A rail supported prime mover, which may be in the form of a switching or yard type locomotive, fully satisfies the motive power requirement.

The present cable laying apparatus incorporates a highly maneuverable, earth cutting blade enabling cable to be laid at specified depths and laterally spaced distances from the railroad tie ends, such maneuverability being a highly desirable feature in view of the necessity of circumventing switch boxes, frogs, etc., spaced along the trackage. An operator, in close proximity to the blade, may carefully and precisely guide the blade along the course specified to avoid the aforementioned obstacles.

Means are disclosed herein for the prevention of damage resulting from contact with hidden or buried obstacles. Such means provide for the release of the blade upon encountering such an obstacle thus avoiding damage to the apparatus. It will be appreciated that considerable momentum is present in the rail supported equipment making the immediate stopping of same, even at low speeds, improbable hence the provision of blade release means.

A further advance in the present art is the provision of a railroad cable laying apparatus embodying the capability for burying cable or conduit along a course spaced from either side of the rail supported mobile base. Accordingly in one pass by the present apparatus cable may be laid on either side of the tracks by reason of dual cable laying instrumentalities. In connection with the dual instrumentalities a partial common use of hydraulic system components is provided for.

SUMMARY

The present invention comprehends the novel combination of a positionable, side mounted cable laying assembly with a track supported mobile base. The cable being laid may accordingly be embedded in the track roadbed or outwardly therefrom in the adjacent right-of-way at selected depths and in a manner to avoid obstructions such as track frogs and other track associated equipment.

Of further importance to the instant invention is the novel feature associated with the earth penetrating blade which permits said blade to avoid damaging contact with buried obstructions such as boulders, discarded tires, etc.

Additional to the foregoing is the novel provision of a pair of side carried cable plow assemblies enabling the laying of cable or conduit on either side of the tracks without reorientating the mobile base's direction of travel over the tracks.

DRAWING DESCRIPTION

In the accompanying drawings:

FIG. 1 is a side elevational view of railroad cable laying apparatus in place upon a track supported mobile base the latter shown in fragmentary form, FIG. 2 is a plan view of the apparatus and mobile base of FIG. 1, FIG. 3 is a plan view of the beam member of a cable plow assembly disposed outwardly from the mobile base and rotated about its own longitudinal axis to accomplish sideward tilting of the blade element, FIG. 4 is an enlarged, side elevational view showing details of the mounting for the blade element, FIG. 5 is a frontal, sectional elevation taken along line 5—5 of FIG. 4 and showing additional structural features for releasably mounting the blade element, FIG. 6 is a sectional, plan view taken along line 6—6 of FIG. 4 and shows hydraulic, blade release means details, FIG. 7 is a view similar to FIG. 6 taken along line 7—7 showing details of a bracket support of said blade release means with the cylinder removed, FIG. 8 is a vertical sectional view taken along line 8—8 of FIG. 1 and shows platform details of the cable laying apparatus in place upon the mobile base, FIG. 9 is a vertical sectional view taken along line 9—9 of FIG. 1 showing a mounting arrangement for a cylinder coupled to said beam member, FIG. 10 is a schematic of a hydraulic system for the present invention.

DESCRIPTION OF PREFERRED EMBODIMENTS

With continuing reference to the accompanying drawings wherein like reference numerals designate like parts the reference numeral 10 indicates a mobile base which in the instant disclosure is in the form of a railroad flat car but may, within the scope of the present invention, be a car of specific design for the cable laying task. The car includes wheel carrying trucks 11 and mounts couplings, not shown, for attachment to associated railroad rolling stock.

In place upon the flatbed 12 of the car is the platform structure 13 of the present apparatus which platform is of welded I-beam construction having lengthwise extending stringers 8 shown in section in FIG. 8 with the center stringer shown therein being located over the center sill 14 of the car. Transversely disposed pairs of I-beams forwardly at 15 and rearwardly at 16 in FIGS. 8 and 9 respectively interconnect the stringers 8 to complete a rigid framework. The front and rear transverse I-beams 15 and 16 extend outwardly from the flatbed 12 of the car and thereat receive, respectively, front I-beam sections 20 and rear I-beam sections 21 later described in detail. The beam framework is covered with steel plate providing decking upon which later described components are affixed.

Securing the platform structure 13 to and making it a part of the mobile base or car 10 are spaced apart pairs of bolts 22 installed adjacent the centerline of the car and platform as typically shown in FIG. 8. Said pairs of bolts closely straddle the platform center stringer 8 and the center sill 14 of the car and receive a plate 23 which is drawn upwardly to bear against the sill 14. Platform 13 is additionally secured especially against asymetrically applied loads by reason of the front and rear I-beam sections 20 and 21 being in close abutting contact with the side sills of the car as shown in dashed lines in FIGS. 8 and 9.

Although the above described platform is mountable on a conventional railway car it is entirely feasible that, within the scope of the instant invention, a railway car may be specifically designed to incorporate the platform or its equivalent in unitary construction with a car framework.

As shown in FIGS. 1 and 2 with additional reference to FIG. 8 the front I-beam sections 20 serve to pivotally mount the forward end of a beam member 25 of the cable laying assemblies indicated generally at 24 and referred to in the art occasionally as cable plows. For purposes of description the cable laying assembly of FIG. 1, hereinafter referred to in conjunction with the terms right-hand side, will be described it being understood that such description is equally applicable to the opposite or left-hand side cable laying assembly seen in the plan view of FIG. 2.

Pivot means generally at 26 provide a universal attachment for the forward end of beam member 25 to front I-beam section 20 such pivot means enabling the beam to be moved, by means later described, about three perpendicularly related axes. Such pivot means includes a shaft 27 extending forwardly through pairs of vertical plates 30 which are welded to the web and flanges of the I-beam section 20 with said shaft being rotatable therein. The shaft receives at its forward end a nut and thrust washer assembly to permit rotation of said shaft under substantial thrust loads. The rearward end of shaft 27 is integral with a clevis 31 within which is hingedly secured by a pivot pin 32, an intermediate member 33. A third pivotal connection is embodied within a clevis 34 mounted at the beam's forward end within which the member 33 is hingedly secured by a pivot pin 35. Accordingly, the beam member 25 may universally move about the horizontal projected axis $x$ of shaft 27, upright axis $y$ of pin 32 and axis $z$ of pin 35 which is generally horizontal and in transverse relationship to the beam 25.

The pivot means above described, the beam 25 and hydraulic cylinder arrangement hereinafter described coupling the beam 25 to the platform 13 are described in the aforementioned patent wherein such is shown in conjunction with a road grader.

Beam member 25 is of welded, box construction providing a rigid member capable of transmitting substantial forward thrust loads to the earth cutting blade while angularly disposed in operation as shown in broken lines in FIG. 2. An arm 36 integral therewith extends in an upright manner from the beam's forward end and carries a ball member 37 which serves to universally mount the rod end of a beam tilt cylinder 38. Midway along the inner side of beam 25 is a second cylinder attachment point comprising a rotatable shaft 40 terminating outwardly in a clevis 41 to receive the pinned end of a piston rod of a lift cylinder 42. Adjacent the trailing end of the beam is a third cylinder attachment point having in similarity to the foregoing, a rotatable shaft 43 (FIG. 3) including a clevis portion 44 to pivotally receive the rod end of an in-out cylinder 45 for beam 25.

The cylinder ends of each of the above three cylinders are coupled to the platform in a manner allowing cylinder movement. In particular, tilt cylinder 38 is mounted by means of a ball joint to a support 46 affixed to the platform, while its piston rod end carries a socket fitting for cooperation with ball member 37.

Lift cylinder 42 is carried in an upright manner suspended at its top end by a pivot pin 47 extending loosely through a plate 50 at the cylinder's top end. The pin is elevated from the platform by a tower structure 51 and permits limited forward movement of the cylinder's lower end upon outward movement of the beam.

In-out cylinder 45 is mounted at its base to the rear I-beam section 21, the attachment point being best shown in FIG. 9 and including a clevis 52 capable of rotational movement and further including a pivot pin (not shown) to allow hinged, swinging movement of the beam. The clevis shaft is journalled in an upright plate 54 which is in angular relationship to the side of the car to permit the swinging of cylinder 45 through a wide arc.

The above cylinders are all of the double acting hydraulic type in circuit individually with a conventional, operator manipulated valve control as shown in the schematic of FIG. 10 and providing extended, retracted and intermediate hold positions for the piston rod of each cylinder. From this it will be evident that beam 25 may be tilted about its own longitudinal axis by movement of the piston rod of tilt cylinder 38, the beam raised or lowered by movement of the piston rod of lift cylinder 42 and said beam swung horizontally by the piston rod of the in-out cylinder 45. The combined movements of the beam is allowed for by the universal pivot means 26 provide for high operational maneuverability of the blade member of the assembly.

Swingably carried by the beam 25 as best shown in FIG. 4, is a U-shaped blade holder 55 within which is adjustably secured the upright blade element indicated at 56. Plates 57 project forwardly from the holder 55 for hinged attachment to lugs 58 on the beam by means of a hinge pin 60 extending vertically through the plates and lugs.

For powered movement of the blade 56 and its holder 55 about the upright hinge pin 60 a hydraulic cylinder 61 is provided such being end mounted at 62 (FIG. 1) on the inner side of beam 25 allowing swinging movement in relation to the beam. The piston rod end 63 as shown in FIGS. 4–7 of cylinder 61 is pivotally attached to plates 64 welded to the holder 55. The purpose of cylinder 61 is to enable the operator to swing the blade 56 about hinge pin 60 to avert obstructions and accordingly a conventional valve control is provided at the operator's station for extending, retracting or holding the piston rod 63 of said cylinder.

The trailing edge of blade element 56 carries a hingedly trailed cable shoe 65 through which the cable or conduit being laid is progressively directed to the bottom of the kerf cut by the blade. The cable shoe is attached by a rod 66 extending through apertured ears carried by the shoe and blade. A roller unit 67 prevents damaging contact by the cable with the upper end of the shoe.

A novel feature of the present invention resides in the hereinafter described means for releasably maintaining the blade 56 within the blade holder 55 for the purpose of avoiding damage to the cable laying assembly upon contact with an underground obstruction. Rearward movement of the blade relative to the blade holder is provided for by utilization of a single pivot pin 70 extending through said blade and a pair of aligned openings 55A in the holder which pin functions as a blade pivot point upon contact of the buried blade segment with an obstruction. FIGS. 1 and 4 show in broken lines the blade tilted upwardly and rearwardly about the axis of pin 70. Blade element 56 defines a series of apertures as at 56A.

Blade release means incorporated a yieldable hydraulic component in the form of a double acting cylinder 71 in fluid communication with a pressure relief valve, later described. Of importance to the present invention, as above noted, is the provision of blade release means which constitutes a safety feature for the cable laying apparatus in the event an underground obstruction is encountered by the blade element.

Hydraulic cylinder 71 including piston rod 71A is mounted forwardly of the blade on a bracket assembly 72 which is secured to and moves horizontally with the blade holder 55 about the upright axis of hinge pin 60. Piston rod 71A terminates in pivoted attachment intermediate a pair of blade carried ears 78. The assembly 72 further comprises a pair of vertical plates 73 extending forwardly from welded securement to opposite sides of the holder 55 and the horizontal plate 57 and the plates 73 being configured as at 74 to clear the lug 58 and the upper end of beam 25. The plates 73 of the bracket assembly are further shaped, as viewed in FIGS. 6 and 7, in a diverging manner to receive a pivoted ring support 75 for cylinder 71 which support includes trunnions as at 76 suitably journalled in bushings 77. A web 73A interconnects the plates 73 below the cylinder. Further stiffening of the plates 73 is achieved by weldments 80 along to the holder 55.

From the blade release means above described it will be evident that the lower portion of blade 56 upon encountering an obstruction may tilt or rotate rearwardly and upwardly about the axis of pin 70 with the resulting forward movement of the upper part of the blade being resisted hydraulically by cylinder 71 and fluid trapped by its associated pressure relief valve as later described.

By way of example only, wherein the distance or arm from the pivot pin 70 to the blade bottom is approximately 6 or 7 feet it has been found practical to set the pressure relief valve in communication with cylinder 71 to initiate fluid passage upon the blade tip encountering an obstacle providing a resistance force exceeding 30,000 pounds. The full rearward blade positioning shown in broken lines is accomplished under increasing blade tip resistance of approximately 35,000 pounds. The one operator located at one of the two control stations 81, having close visual surveillance of the blade at all times, upon detection of such rearward blade movement may immediately activate cylinder 61 in an effort to circumvent the obstruction. If such "steering" movement imparted to the blade by cylinder 61 does not result in avoidance of the obstruction the operator may raise blade 56 by actuation of lift cylinder 42 to cause said blade to ride over the obstruction. Such blade movements may be simultaneous and fully within the capability of a skilled operator during a cable laying operation proceeding at a speed of approximately two miles per hour. A valve console 82 is located at each of the dual operator stations 81 with the valve control levers being in juxtaposed relationship to enable the operator to move said levers by fingertip movement alone. In actual operation hydraulic cylinders 38, 42 and 45 may be activated simultaneously to provide multiple movements of the beam 25 with or without activation of the blade steering cylinder 61.

While a pivotally mounted blade 56 has been shown and described in conjunction with a hydraulic blade release means it is feasible to provide mechanical blade release means incorporating a shear pin arrangement. Such an arrangement would simply involve a shearable pin being inserted through a second aperture one of which is shown at 56A in blade 56 and through a pair of aligned apertures 55A in the U-shaped blade holder 55, said shearable pin being vertically spaced from the pivot pin 70. Accordingly the shearing of the pin upon a predetermined load against the blade would avoid damage to the cable plow assembly.

The hydraulic cylinder 71 as shown in the hydraulic schematic of FIG. 10 may be controlled through a valve control to impart extension or retraction to the cylinder's rod 71A to selectively tilt the blade 56.

Indicated generally at 83 is a vibratory unit secured to the upper end of blade 56, the advantages of imparting vibratory motion to the blade being widely known in the art and primarily residing in the reduction in the motive force required to draw the blade through the ground. The unit briefly embodies a cylindrical raceway 85 (FIG. 5) housing a roller at 84 driven about the inner circumference of the raceway 85 in a rapid manner to impart vibratory motion to the blade. A drive shaft 86 carries a pair of bearing plates one of which is shown at 87 in which the roller 84 is journalled at its ends. The shaft 86 is in driven engagement through a coupling 88 with a gear type hydraulic motor 89 supplied by conduit lines as shown in FIG. 10. To dissipate heat resulting from rolling contact of roller 84 with its raceway 85 a coolant is circulated within a jacket 90 and about the exterior of the raceway. The coolant, which as shown in FIG. 10, is circuited through the radiator of an engine 96 and circulated by the engines water pump back to the jacket via conduit circuit 79.

With attention to FIG. 10 the hydraulic system shown includes tandem pumps 94, 95 of the positive displacement type in driven engagement with engine 96. The gear type pumps 94 and 95 are rated at forty and twenty gallons per minute respectively and draw individually from a hydraulic reservoir 97.

Hydraulic fluid is delivered to pump 94 via conduit 99 and thence to a two-position valve 98 controlling the pressurized flow of fluid to motor 89 which as aforesaid powers the vibratory unit 83. The two-position valve 98 may, alternatively, divert fluid through a reservoir return line 100 which is a common return for the hereinafter described valves.

The valve 98 includes manually adjustable valve means 101 capable of by-passing a portion of the output of pump 94 for arriving at the desired pressure as indicated on pressure gage 102. Accordingly motor 89 and vibrator 83 may be run at a speed to produce the vibratory action desired in the blade. The fluid line 103 to motor 89 and reservoir 97 has a back pressure reducing valve 104, reducing pressure in the line prior to the fluid entering radiator 91 from whence it is returned to the reservoir 97. The radiator 91 partakes of the cooling flow of air drawn into the engine by the engine's own cooling system.

Closely arranged for convenient manipulation in the valve console 82 are five three-position valves 107, 108, 109, 110 and 111. Valves 107–111 are provided with a common supply of fluid pressurized by pump 95 and delivered via conduit 112 which incorporates a relief valve 113 settable to provide a line pressure to the valves at approximately 1100 p.s.i.

For activating the opposite cable plow assembly the fluid output of the two tandem pumps 94–95 may be directed by valve means to the other valve console 82 located adjacent the operator's station on the opposite side of the platform 13. Accordingly valves at 120 in line 99 and at 121 in line 112 may be positioned to divert fluid flow through lines 122 and 123 to energize, respectively, the other motor 89 as well as the other five hydraulic cylinders associated with the opposite cable plow assembly.

Hydraulic cylinder 71 associated with valve 107 is pressurized via line 114 to adjustably extend its piston rod 71A to locate the blade 56 in a substantially upright, operative position. A return line 115 interconnects the rod end of cylinder 71 to the valve 107. The blade release means in addition to cylinder 71 includes a pilot operated check valve 116 permitting fluid passage into the base end of cylinder 71 and a relief valve 117 capable of relieving pressure in line 114, intermediate check valve 116 and cylinder 71. Relief valve 117 is operable at a selected pressure to exhaust fluid in a metered manner from the base end of the cylinder 71 upon the above described contact of the blade 56 with an obstruction.

A thoroughly functional arrangement of the blade release means, by way of example, includes a cylinder 71 of approximately 6 inches in diameter hydraulically charged at its base end to 1100 p.s.i. The relief valve 117 is set to initiate fluid unloading or "cracking" at 4500 p.s.i. to permit controlled release of blade 56 in a rearward tilting direction subsequent to blade contact with an obstruction. Prior to full rearward movement (broken line position) the other valve controls 108–111 may be manipulated to move the blade in other direction to avoid the obstruction.

For controlling cylinder 61 for swinging the blade 56 about the upright axis of hinge pin 60, the valve 108 in similarity to other valve 107, 109, 110 and 111 may direct fluid to either side of its associated cylinder to extend, retract or hold therebetween the cylinder's piston rod. In a straight ahead plowing sequence the blade 56 is positioned in parallel with the track. Momentary changes in blade course may be accomplished by directing pressure to either side of cylinder 61.

The remaining three cylinders and their associated valve controls serve to position the beam 25 about the axes described in conjunction with the pivot means 26. Cylinder 38 may be actuated to extend or retract its piston rod to tilt the beam about the beam's longitudinal axis as exemplary shown in FIG. 3 to transversely incline blade 56. Cylinder 42 as aforesaid lifts the beam 25 to determine the depth, which of course will vary.

Cylinder 45 provides for the in-and-out positioning of beam 25 in relation to the railroad car side to locate the blade laterally for travel along a desired course at a specified distance from the end of the ties.

While the railroad plow is shown and described preferably as comprising a pair of identical cable laying assemblies 24, a practical railroad plow has been embodied in a single side mounted cable plow assembly.

Further, as previously mentioned, the platform 13 may be dispensed with and the present invention incorporated into an integral mobile base structure such as a railroad car specifically designed for cable laying.

What I claim and desire to protect by Letters Patent is:
1. A railroad cable laying apparatus comprising in combination:
 a mobile base having track supported wheels,
 a cable laying assembly carried by said mobile base and comprising:
  a beam carried by said base laterally offset from the centerline of said mobile base,
  said beam trailing rearwardly relative to a point located along said mobile base,
  a blade element carried at the rearward end of said beam and attached thereto in a manner allowing both horizontal swinging and rearward movement of said blade relative to said beam, said blade for cutting a kerf in the ground along an adjacent said track,
  means trailed by said blade element for depositing a cable in the kerf,
  blade release means for permitting said rearward movement of said blade element upon blade contact with a ground obstruction resisting the passage of said blade,
  hydraulic cylinders coupled with said beam and with said mobile base for imparting swinging movement to said beam whereby said blade element may be selectively positioned relative to and offset from the centerline of said mobile base,
 pivot means disposed at said point along said mobile base and pivotally mounting the forward end of said beam thereto allowing lateral and downward swinging movement of said beam.

2. The invention as claimed in claim 1 wherein said cable laying assembly and said pivot means are carried by said mobile base in a dual manner offset oppositely from the centerline of the mobile base whereby cable may be laid on either side of the mobile base while same is moving in one direction.

3. The invention as claimed in claim 1 wherein said blade release means includes hydraulic components and valve means for the relief of hydraulic fluid pressure in said components subsequent to blade contact with an obstruction to thereby allow said rearward movement of said blade element.

4. The invention as claimed in claim 3 wherein said hydraulic components include a hydraulic cylinder linked with said blade element to maintain same normally in an upright position and a pressure relief valve in fluid communication with the last mentioned cylinder whereby cylinder fluid pressure may be relieved to permit said blade movement.

5. The invention as claimed in claim 1 wherein said blade element is pivotally mounted for movement about a horizontal axis within a blade holder trailed by said beam and wherein said blade release means includes a hydraulic cylinder linked with and normally positioning said blade element about said horizontal axis to a vertical operative position whereby upon encountering an obstruction the lower end of said blade element may pivot rearwardly.

6. The invention as claimed in claim 5 wherein said blade release means includes said hydraulic cylinder and valve means in communication therewith for automatic relief of hydraulic fluid pressure in the last mentioned cylinder generated upon said blade encountering an obstruction.

7. The invention as claimed in claim 1 said mobile base comprises a railroad flat car and a platform removably secured in place thereon.

8. A railroad cable laying apparatus comprising in combination:
 a mobile base having track supported wheels and including a platform structure mounted in place thereon,
 a cable laying assembly carried by said platform structure and comprising:
  a beam carried by said platform and laterally offset from the centerline of said mobile base,
  said beam trailing rearwardly relative to a point located along said platform structure,
  a blade element carried at the rearward end of said beam and attached thereto in a manner allowing both horizontal swinging and rearward movement of said blade relative to said beam, said blade for cutting a kerf in the ground along and adjacent said track,
  means trailed by said blade element for depositing a cable in the kerf, blade release means for permitting said rearward movement of said blade element upon blade contact with a ground obstruction resisting the passage of said blade, hydraulic cylinders coupled with said beam and with said platform structure for imparting swinging movement to said beam whereby said blade element may be selectively positioned relative to and offset from the centerline of said mobile base, and pivot means disposed at said point along said platform structure and pivotally mounting the forward end of said beam thereto allowing lateral and downward swinging movement of said beam.

9. The invention as claimed in claim 8 wherein said cable laying assembly and said pivot means are carried by said platform structure in a dual manner offset oppositely from the centerline of the mobile base whereby cable may be laid on either side of the mobile base while the same is moving in one direction.

10. In combination:

a railroad car, a cable plow assembly carried by said car in a laterally offset manner and including a blade element for cutting a kerf in the ground surface alongside the road bed of the track travelled by said car and adapted for pivotal movement about a horizontal transverse axis, a beam positionable relative to the side of the railroad car, hydraulic cylinders carried by the car and coupled to said beam for positioning of same, a cable shoe trailed by the blade element, said plow assembly further including blade release means permitting rearward movement of the ground engaging portion of said blade element about said axis relative to other components of the cable plow assembly upon the element encountering a ground obstruction whereby blade damaging contact with the obstruction is avoided during continued advancement of the railroad car, and pivot means interposed between the forward end of he beam and the car pivotally mounting the forward end of the beam thereto.

11. The invention as claimed in claim 10 wherein said blade release means includes a hydraulic cylinder and relief valve means for the automatic relief of elevated hydraulic fluid pressure in said cylinder above a predetermined pressure incident to blade contact with an obstruction.

12. The invention as claimed in claim 11 wherein said cable plow assembly additionally includes a blade holder trailed by said beam in a manner permitting horizontal swinging movement of the holder relative to the beam, said cylinder of the blade release means being carried by the holder and swingable therewith and with the blade element.

13. The invention as claimed in claim 10 wherein said blade release means comprises a mechanical lock for said blade including a shearable member retaining the blade in an upright position during normal operation.

14. In combination with a railroad car:

a cable plow assembly carried by said car in a laterally offset manner for the burying of cable along railway trackage and including:

a beam positionable relative to the side of the car and trailing rearwardly relatively to a point located on said car, a blade element trailed by said beam for cutting a ground kerf and adapted for pivotal movement about a horizontal transverse axis, said blade element having a cable shoe carried therebehind, hydraulic cylinders carried by the car and coupled to said beam for positioning of the beam, blade release means associated with the blade element and permitting rearward movement of the ground engaging portion of the blade element about said axis relative to other components of the cable plow assembly upon the blade element encountering a ground obstruction permitting circumvention of same by the blade to avoid blade damage during continued forward movement of the railroad car, and pivot means interposed between the forward end of the beam and the car pivotally mounting said beam forward end thereto allowing lateral and downward swinging movement of the beam.

15. The invention as claimed in claim 14 additionally including a platform mounted in place on said railway car and serving to mount the beam coupled hydraulic cylinders and the said pivot means to the car, said platform having sections in abutting contact with the side sills of the car for transfer of asymmetrical loads to the car during cable laying.

16. The invention as claimed in claim 14 wherein said blade release means includes a hydraulic cylinder normally retaining the blade element in an upright position and relief valve means in fluid communication with said cylinder for the relief of elevated fluid pressure beyond a pre-set value incident to blade contact with an obstruction.

17. The invention as claimed in claim 16 wherein said plow assembly additionally includes a blade holder trailed by said beam in a manner permitting horizontal swinging movement of the holder relative to the beam, said cylinder of the blade release means being carried by the holder and movable therewith.

18. The invention as claimed in claim 14 wherein said blade release means comprises a mechanical lock for said blade element including a shearable member retaining the blade in an upright position during normal cable plowing operations.

References Cited

UNITED STATES PATENTS

| | | | |
|---|---|---|---|
| 436,914 | 9/1890 | Fischer | 61—72.5X |
| 3,395,545 | 8/1968 | Mendaloff, Jr. | 61—72.6X |
| 3,431,741 | 3/1969 | Kinnan | 61—72.6X |

JACOB SHAPIRO, Primary Examiner

U.S. Cl. X.R.

61—72.5, 72.6